June 17, 1930.                J. SINKO                1,764,899
                     MOUNTING FOR CIGAR LIGHTERS
                          Filed Nov. 1, 1926
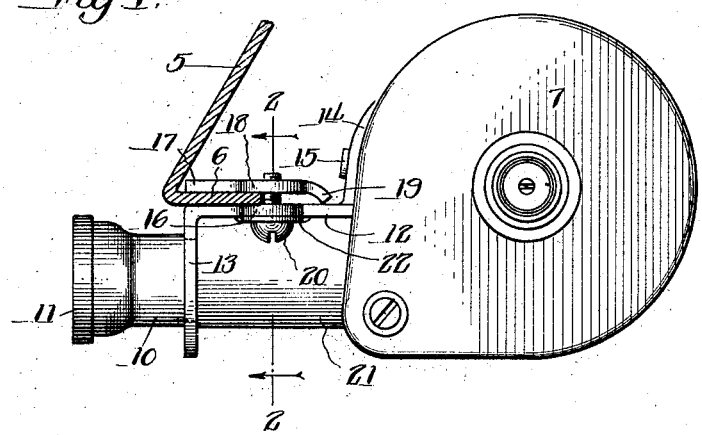
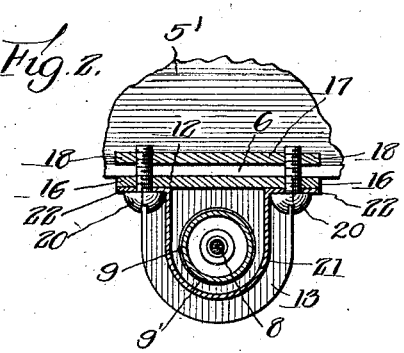
Inventor:
John Sinko,
By Fisher, Towle, Clapp + Soans
               Attys.

Patented June 17, 1930

1,764,899

UNITED STATES PATENT OFFICE

JOHN SINKO, OF CHICAGO, ILLINOIS

MOUNTING FOR CIGAR LIGHTERS

Application filed November 1, 1926. Serial No. 145,645.

One of the common accessories of the modern automobile is the electric cigar lighter, and a well-known type of electric cigar lighter consists of a casing in which is journaled a reel or drum carrying an electric cord. One end of said cord extends through a hole in the casing and is equipped with a knob or tip in which is mounted a fine wire filament included in the electric circuit line. When the cord is drawn out and unwound from the reel the circuit is closed and the filament is heated to incandescence. When the knob is released the circuit is broken and the cord is rewound on the reel by a clock spring.

The instrument board, in most makes of cars, consists of a flat sheet-metal panel that, for the sake of increased rigidity and the avoidance of a sharp or raw lower edge, is formed on its lower edge with a substantially horizontal integral lip or flange extending in the direction of the rear or back side of the board. This flange can advantageously be used as a support for the cigar lighter casing, and the main object of my invention has been to provide a simple, inexpensive, and easily applied and removed attaching device in the nature of a bracket and clamp by which the cigar lighter and its tip may be rigidly and securely mounted on and supported by the said flange.

My invention, in one simple and practical form in which it may be embodied, is illustrated in the accompanying drawing, in which—

Fig. 1 is a vertical section through the lower portion of the instrument board of an automobile, showing in side elevation a cigar lighter mounted on the lip or flange of the instrument board by my improved fastening device;

Fig. 2 is a cross-section taken on the line 2—2 of Fig. 1.

Referring to the drawing, 5 designates the lower portion of a flat sheet-metal instrument board, continuous with the lower edge of which is a rearwardly bent substantially horizontal flat lip or flange 6. 7 designates the reel casing of the cigar lighter, with the structural details of which the present invention is not concerned. Through a hole in the lower portion of the front edge wall of the casing extends the cord 8 carrying the circuit wires which latter are connected to central and sleeve terminals of an ordinary lamp socket 9 in which is fitted the plug (not shown) carrying the filament. Encircling the plug and socket with a bayonet-joint connection to the latter is a sleeve 10 terminating at its outer end in a hollow pull knob 11.

An angle bracket comprising a horizontal limb 12, a vertical depending limb 13 at one end of the limb 12, and a tongue 14 at the other end of the limb is rigidly attached to the front edge wall of the casing 7 by a rivet 15 passed through said tongue and wall. On the longitudinal edges of the limb 12 are apertured ears 16, and this bracket limb 12 forms the lower member of a clamp that grips the flange 6; the upper member of said clamp consisting of a plate 17 of substantially the same dimensions as the bracket limb 12 and formed on its longitudinal edges with apertured ears 18 registering with the ears 16. The plate 17 is formed at its rear end with a downwardly bent tail-piece 19 that fulcrums on the plate 12, as clearly shown in Fig. 1. The ears 18 are tapped to receive binding screws 20, by which the two members of the clamp are drawn to a tight grip on the flange 6.

The depending limb 13 of the bracket is apertured for the passage of the socket 9, the latter being formed with an annular shoulder indicated at 9′ in Fig. 2 which forms a stop co-operating with the margin of the aperture and, under the pull of the cord, holding the sleeve and knob in the horizontal position shown. Preferably a U-shaped guard or cover 21 for the cord is interposed endwise between the bracket limb 13 and the front wall of the casing 7 around the socket 9, said guard being secured in place by the screws 20 passed through apertured ears 22 on the side edges of the guard.

From the foregoing it will be seen that the device above described avoids the necessity of providing a hole in the instrument board for the passage of a supporting stem or shank of the casing, it provides a simple fastening device which can be manipulated solely by the use of a screwdriver, and, since the clamping screws are entered from beneath in a vertical direction the operation of applying and removing them is easily performed due to the fact that there is ample room for the manipulation of the tool between the lower edge of the instrument board and the floor of the car.

I claim—

1. The combination with the casing of a cigar lighter, of an angle bracket comprising a horizontal plate adapted to underlie the flange of an instrument board, an apertured vertical plate depending from the front end of said horizontal plate forming a holder for the socket member of the cigar lighter, and a tongue extending from the rear end of said horizontal plate secured to a wall of said casing, a co-operating clamp plate adapted to overlie said flange and at its rear end bear on the horizontal limb of said bracket, and clamp screws passed through said horizontal bracket limb and screwing into tapped holes in said co-operating clamp plate.

2. The combination with the casing of a cigar lighter, of an angle bracket comprising a horizontal plate adapted to underlie the flange of an instrument board, an apertured vertical plate depending from one end of said horizontal plate and forming a holder for the socket member of a cigar lighter, and a tongue extending from the opposite end of said horizontal plate and secured to a wall of said casing, a co-operating clamp plate adapted to overlie said flange and at its rear end bear on the horizontal limb of said bracket, a U-shaped guard fitted endwise between the vertical limb of said bracket and the opposed wall of said casing and formed with apertured ears, and clamp screws passed through said ears and said horizontal bracket plate and screwing into tapped holes in said co-operating clamp plate.

JOHN SINKO.